Figure 1:
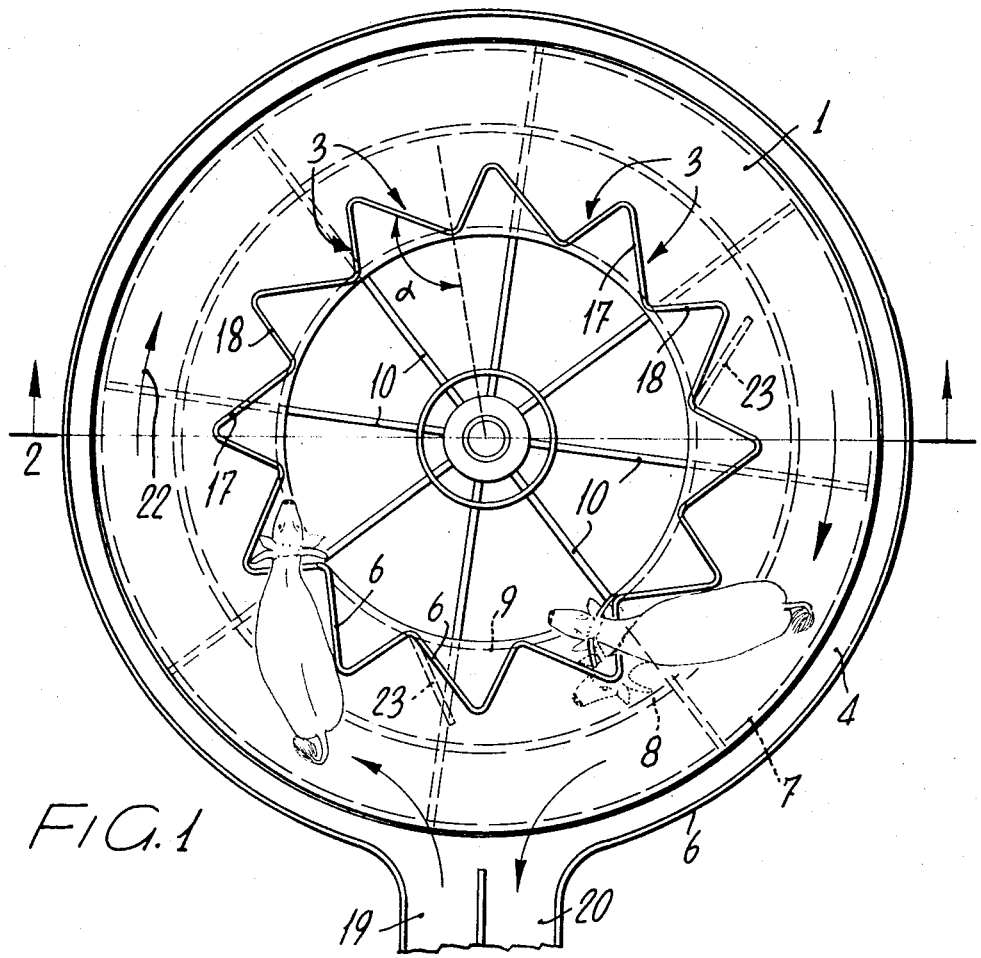

United States Patent [19]
Ciribelli

[11] 3,752,122
[45] Aug. 14, 1973

[54] EQUIPMENT FOR MILKING
[76] Inventor: Giorgio Ciribelli, Via Privata Penza 6, Milan, Italy
[22] Filed: Sept. 1, 1971
[21] Appl. No.: 176,996

[30] Foreign Application Priority Data
Sept. 11, 1970 Italy .............................. 29622 A/70

[52] U.S. Cl. ............................................. 119/14.04
[51] Int. Cl. ................................................. A01j 5/00
[58] Field of Search ..................... 119/14.03, 14.04

[56] References Cited
UNITED STATES PATENTS
2,305,259  12/1942  Jeffers, Sr. ...................... 119/14.04
3,095,854  7/1963  Bott et al. ......................... 119/14.04
3,116,713  1/1964  Darling ............................. 119/14.04
3,301,215  1/1967  Shakarian ..................... 119/14.03 X Primary Examiner—Russell R. Kinsey
Assistant Examiner—J. N. Eskovitz
Attorney—Stepno & Neilan

[57] ABSTRACT

A cow milking equipment comprises a rotable annular platform continuously rotated at a constant speed by a suitable motor and is provided with a plurality of stall angulated relative to a radial direction, for accomodating a cow that is to be milked, so as to enable the animal to enter and exit from the stall always passing over the outer peripheral edge of the platform.

5 Claims, 2 Drawing Figures

INVENTOR
GIORGIO CIRIBELLI

BY  STEPNO and NEILAN
ATTORNEYS

EQUIPMENT FOR MILKING

This invention relates to an equipment for automatically and successively milking a plurality of cows that, during the entire milking operation, are transported on a rotating platform between entrance and exit positions from the platform.

Many automatic equipments are known, but suffer from the drawback of being bulky or capable of accomodating a comparatively reduced number of cows to be milked. Moreover, these equipments require complicated and expensive supporting and guiding structures and also make it difficult for the animals to enter on and exit from the platform.

Therefore, it is the object of the present invention to provide an improved equipment for cow milking, which is free of the disadvantages associated with the equipments of the prior art which, while facilitating the animal entrance and exit for the milking operation, is capable of allowing concurrent milking of a comparatively higher number of animals.

The milking equipment according to the invention essentially comprises a rotating annular platform having a plurality of stalls, each of which suitable to accomodate a cow while being milked by proper milking equipment, and operating means for rotating said platform at a constant speed, such that a milking cycle can be completed during a full revolution of the platform; the equipment being characterized in that on the platform the stalls are arranged at an angle relative to a predetermined radial direction, so that each of the stalls are angulated at such an angle to enable a cow to enter and exit from its associated stall always passing over the outer peripheral edge of the platform. The equipment also comprises a number of milking outfits carried under the platform sufficient for milking as many cows as the stalls.

Figure 2:
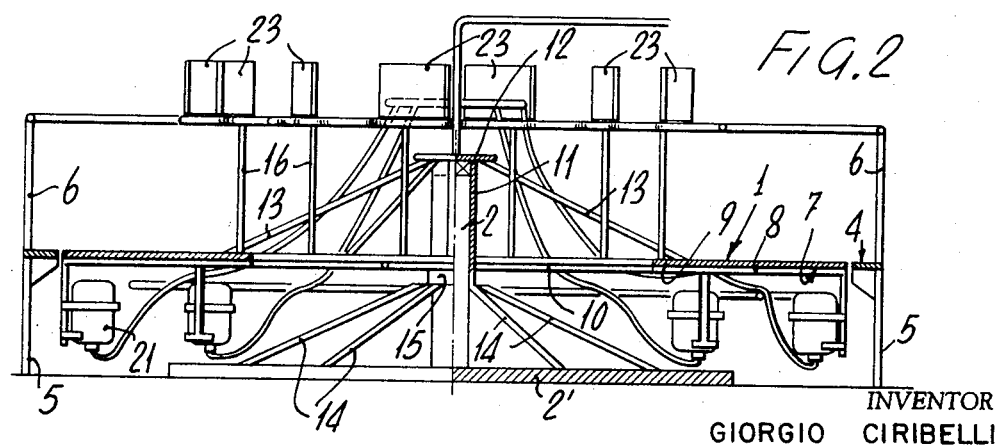

The invention will be better understood from the following description, given by way of example, with reference to the appended drawings in which:

FIG. 1 is a top schematic diagram showing a milking equipment according to the invention; and FIG. 2 is a schematic side and partly sectional view showing the equipment in FIG. 1.

Referring to the drawings, it will be seen that the milking equipment according to the invention substantially comprises an annular platform 1 rotatably carried by a central upright 2 which is secured to a base 2' suitable to rest on the ground. At the top this rotating platform 1 has a plurality of stalls 3 for accomodating as many cows to be milked and an outer board 4 for the operator, the board 4 being supported by pedestals 5 and provided with a guard 6.

In the embodiment shown, the platform 1 comprises three concentric circular C-sectioned beams designated by 7, 8 and 9, respecitvely which are connected by eight radial beams 10 which at the inner end thereof are secured to a tubular element 11 for pivoting the platform to said upright 2. At the upper end of element 11 a thrust bearing 12 is provided for the axial thrust and at the lower end a centering bronze bushing (not shown in the drawings) is provided. Radial tie rods 13, connected to the upper end of the tubular element 11 and radial beams 10, respectively, enable to stiffen and reinforce the platform structure.

Similarly, the base 2' is stiffened by means of radial tie rods 14 which are secured by the lower end thereof to said base 2' and by the upper end thereof to a collar 15 surrounding the upright 2.

As clearly shown in FIG. 2, each stall 3 is angulated relative to a radial direction. More particularly, on the inner peripheral edge of the rotating platform 1 an enclosure is formed and substantially comprises tubular stanchions 16 which at the lower end thereof are suitably secured to the rotating platform 1 and carry at the upper end thereof a tubular element substantially of a star-like configuration having tubular sections 17 and 18 subsequent to one another and differently oriented to define said stalls 3.

Each section 17 comprising the inner side is arranged lengthwise of the stall, while each section 18 is arranged substantially transversely of the stall and comprises the front side or portion against which the animal rests with its chest during milking operation. In FIG. 1, the sections 17 and 18 corresponding to a stall are at an angle of about 90° to each other, but this angle could be greater or smaller than that mentioned, such as in the range of 70° – 120°, provided it will allow for entry and exit from the outer peripheral edge of the platform of the cows properly in columns in the entrance passages 19 and exit passages 20 (FIG. 1).

As clearly shown in FIG. 1, each inner side 17 arranged lengthwise of a stall makes a predetermined inner angle $\alpha$ with the radius intersecting the angle between the sides 17 and 18 of each stall 3, so that an animal is accomodated on the platform at a correspondingly oriented position. In the particular embodiment shown, this angle $\alpha$ is about 120°, but it is apparent that the seats could be differently inclined making an angle $\alpha$ ranging between 95° and 125°. Thus, at the same overall plan size of a known type of rotating platform, a higher amount of stalls can be provided. Of course, the inclination of the several stalls and hence the amount thereof is varied according to the rotating platform size, a higher amount of stalls being obtainable on a larger-sized platform. However, the stall inclination should always be such as to facilitate the entry and exit for the cows across the outer peripheral edge of the rotating platform, as above stated.

Beneath the rotating platform 1 and at each of the stalls 3, a per se known type of milking device 21 is provided and suitably connected to a piping system for vacuum and milk transport, this system being schematically shown in FIG. 2, but not described in detail.

The operation of such an equipment can be readily summarized as follows: the cows in columns along the passage 19 move onto the platform 1 which is continuously rotated in the direction of arrow 22 by an apparatus (not shown), each of the cows being accomodated in a stall previously cleared off by a cow that had completed its milking cycle and had moved through the passage 20. The positioned animal is then supplied with the milking device and the milking operation is completed during a full revolution of the platform.

From the foregoing and as shown in the drawings, it will then be appreciated that a milking equipment has been provided which, at a same size and hence at a same overall plan size enables the provision of a greater number of stalls thus allowing higher efficiency for the whole milking operation.

It should be also specified that each of the stalls can be fitted at the top of its longitudinal side 6 with a swiveling door 23 for preventing an animal from troubling with its head, or being troubled by an adjoining animal.

The door control can be made automatic, so as to facilitate the animal's exit at the end of milking operation.

What is claimed is:

1. Milking apparatus for dairy cows comprising
a base having a central upright support member,
an annular platform rotatably disposed upon said upright support member,
a stationary walkway disposed about the outer periphery of said rotatable platform and coplanar therewith,
an entrance ramp and an exit ramp adjacent thereto, said entrance ramp and said exit ramp being contiguous said walkway,
a planar star-shaped guide rail mounted to said annular platform in superposition with the inner periphery thereof,
said star-shaped guide rail being formed of a plurality of contiguous first and second rail sections defining the front and inner sides, respectively, of a like plurality of milking stalls, each disposed at an angle with respect to a radius of said annular platform through the intersection of said front and side rails wherbeby said front rail supports the head of each cow adjacent the inner periphery of said platform and said side rail maintains the cow at a preselected angle.

2. The invention as recited in claim 1 wherein said first and second rail sections defining each stall are disposed at an angle of about 90° relative each other and each of said second rail sections are disposed at an angle in the range of about 95° to 125° relative to a radius intersecting the inner end thereof.

3. The invention as recited in claim 1 wherein each of said first rail sections is disposed on the side of its respective stall adjacent said entrance ramp and each of said second rail sections is disposed on the side of its respective stall adjacent said exit ramp whereby cows enter onto said platform and exit from said platform without crossing paths.

4. The invention as recited in claim 1 further including a plurality of swiveling doors mounted adjacent each stall to isolate each cow from interference with an adjacent animal.

5. The invention as recited in claim 1, further including a plurality of milking devices associated with each stall and mounted to the underside of said annular platform.

* * * * *